(12) United States Patent
Ruhland et al.

(10) Patent No.: US 11,248,542 B2
(45) Date of Patent: Feb. 15, 2022

(54) METHODS AND SYSTEMS FOR A VEHICLE

(71) Applicant: Ford Global Technologies, LLC, Dearborn, MI (US)

(72) Inventors: Helmut Ruhland, Eschweiler (DE); Albert Breuer, Cologne (DE); Thomas Lorenz, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/992,993

(22) Filed: Aug. 13, 2020

(65) Prior Publication Data
US 2021/0062738 A1 Mar. 4, 2021

(30) Foreign Application Priority Data

Aug. 30, 2019 (DE) .......................... 102019213132.8

(51) Int. Cl.
| | | |
|---|---|---|
| *F02D 41/00* | (2006.01) | |
| *F02D 41/10* | (2006.01) | |
| *F02D 13/02* | (2006.01) | |
| *F02M 21/02* | (2006.01) | |
| *F02D 41/14* | (2006.01) | |
| *F02D 41/12* | (2006.01) | |

(52) U.S. Cl.
CPC ..... *F02D 41/0027* (2013.01); *F02D 13/0207* (2013.01); *F02D 13/0261* (2013.01); *F02D 41/0002* (2013.01); *F02D 41/005* (2013.01); *F02D 41/006* (2013.01); *F02D 41/0072* (2013.01); *F02D 41/10* (2013.01); *F02M 21/0206* (2013.01); *F02D 13/0253* (2013.01); *F02D 13/0273* (2013.01); *F02D 41/12* (2013.01); *F02D 41/1475* (2013.01); *F02D 2041/001* (2013.01); *F02D 2200/602* (2013.01)

(58) Field of Classification Search
CPC .... F02M 21/0206; F02M 25/10; F02M 26/01; F02D 13/0203–0238; F02D 13/0253; F02D 13/0257; F02D 13/0261; F02D 13/0273; F02D 19/0644; F02D 41/0002; F02D 41/0027; F02D 41/10; F02D 2041/001; F02D 2200/602
See application file for complete search history.

(56) References Cited

U.S. PATENT DOCUMENTS

| | | | | |
|---|---|---|---|---|
| 4,722,315 | A * | 2/1988 | Pickel ................... | F02D 41/006 123/568.14 |
| 5,134,850 | A * | 8/1992 | Saito ................... | F02D 13/0238 60/313 |
| 5,271,359 | A * | 12/1993 | Teramoto ................ | F02B 43/00 123/216 |

(Continued)

FOREIGN PATENT DOCUMENTS

| | | | | |
|---|---|---|---|---|
| DE | 10321794 A1 | 12/2004 | | |
| DE | 102005032791 A1 * | 1/2007 | ............. | F02M 26/01 |

(Continued)

*Primary Examiner* — John M Zaleskas
(74) *Attorney, Agent, or Firm* — Geoffrey Brumbaugh; McCoy Russell LLP

(57) ABSTRACT

Methods and systems are provided for a hydrogen combustion engine. In one example, a method may include operating the hydrogen combustion engine at one of two combustion air ratios, wherein a combustion air ratio between the two is avoided via adjusting one or more operating parameters.

16 Claims, 7 Drawing Sheets

(56) References Cited

U.S. PATENT DOCUMENTS

| | | | | |
|---|---|---|---|---|
| 5,392,740 A * | 2/1995 | Teramoto | ............... | F02B 43/00 123/3 |
| 5,396,874 A * | 3/1995 | Hitomi | ................... | F02B 33/36 123/559.1 |
| 5,413,075 A * | 5/1995 | Mamiya | ............ | F02M 21/0206 123/431 |
| 6,257,213 B1 * | 7/2001 | Maeda | ................... | F01L 13/06 123/568.14 |
| 6,439,210 B1 * | 8/2002 | Faletti | ................ | F02D 13/0273 123/568.14 |
| 6,651,623 B1 * | 11/2003 | Tang | .................... | F02D 19/081 123/406.23 |
| 6,655,324 B2 * | 12/2003 | Cohn | ................. | F02D 41/0025 123/1 A |
| 7,281,531 B1 | 10/2007 | Fulton et al. | | |
| 2002/0185086 A1 * | 12/2002 | Newman | .............. | F02D 19/023 123/1 A |
| 2003/0005898 A1 * | 1/2003 | Gianolio | ............... | F02B 47/08 123/90.13 |
| 2003/0089337 A1 * | 5/2003 | Cohn | ................... | F02D 41/005 123/435 |
| 2003/0160455 A1 * | 8/2003 | Hu | ....................... | B60K 6/485 290/40 C |
| 2003/0164163 A1 * | 9/2003 | Lei | ....................... | F02M 26/01 123/568.14 |
| 2004/0055281 A1 * | 3/2004 | Tang | .................... | F01N 3/0842 60/278 |
| 2004/0065274 A1 * | 4/2004 | Cohn | ....................... | F02B 1/12 123/1 A |
| 2004/0237512 A1 * | 12/2004 | Tang | .................... | F01N 3/0842 60/295 |
| 2004/0250802 A1 * | 12/2004 | Yang | .................. | F02D 13/0226 123/568.14 |
| 2005/0000499 A1 * | 1/2005 | Ruggiero | ........... | F02D 13/0265 123/568.14 |
| 2005/0016496 A1 * | 1/2005 | Hitomi | ................... | F01L 1/053 123/305 |
| 2005/0050882 A1 * | 3/2005 | Poola | .................... | F02M 26/01 60/285 |
| 2005/0076890 A1 * | 4/2005 | Seitz | ................... | F02D 13/0226 123/568.14 |
| 2005/0087158 A1 * | 4/2005 | Tanei | ...................... | F02P 5/152 123/90.15 |
| 2005/0188683 A1 * | 9/2005 | Miyoshi | ............. | F02D 19/0692 60/286 |
| 2005/0229909 A1 * | 10/2005 | Nakazawa | ......... | F02D 41/0062 123/568.14 |
| 2005/0252484 A1 * | 11/2005 | Vanderpoel | ............... | F01L 9/02 123/321 |
| 2006/0000456 A1 * | 1/2006 | Preis | ................. | F02M 21/0206 123/527 |
| 2006/0112926 A1 * | 6/2006 | Date | .................... | F02D 41/405 123/299 |
| 2006/0266312 A1 * | 11/2006 | Lucatello | .................. | F01L 9/02 123/90.15 |
| 2007/0039598 A1 * | 2/2007 | Wakayama | ......... | F02D 41/0027 123/568.21 |
| 2007/0107703 A1 * | 5/2007 | Natkin | .................... | F02B 43/00 123/527 |
| 2007/0119428 A1 * | 5/2007 | Leone | ..................... | F02B 37/00 123/527 |
| 2008/0060625 A1 * | 3/2008 | Raymond | ............ | F02D 13/023 123/568.14 |
| 2008/0167791 A1 * | 7/2008 | Fulton | ................. | F02D 41/0027 701/108 |
| 2008/0202449 A1 * | 8/2008 | Shimada | ............. | F02D 19/0628 123/3 |
| 2009/0012698 A1 * | 1/2009 | Shinagawa | ......... | F02D 13/0215 701/103 |
| 2009/0071452 A1 * | 3/2009 | Phlips | ................. | F02D 19/0644 123/575 |
| 2009/0071453 A1 * | 3/2009 | Stockhausen | ......... | F02D 19/061 123/577 |
| 2009/0093949 A1 * | 4/2009 | Boyer | ................. | F02D 41/0027 701/105 |
| 2009/0260606 A1 * | 10/2009 | Stockhausen | ....... | F02D 19/0644 123/577 |
| 2010/0174470 A1 * | 7/2010 | Bromberg | ............... | F02B 17/00 701/103 |
| 2010/0206249 A1 * | 8/2010 | Bromberg | ........... | F02D 19/0671 123/3 |
| 2010/0217504 A1 * | 8/2010 | Fujii | ................... | F02D 13/0226 701/105 |
| 2011/0094462 A1 * | 4/2011 | Durrett | ................... | F02B 47/10 123/58.1 |
| 2011/0144838 A1 * | 6/2011 | Matthews | ............... | B60W 20/11 701/22 |
| 2011/0301826 A1 * | 12/2011 | Galindo | ................ | F02D 19/066 701/103 |
| 2013/0104544 A1 * | 5/2013 | Schilling | ............. | F02D 13/0261 60/605.2 |
| 2014/0007854 A1 * | 1/2014 | Kosaka | ............... | F02D 13/0265 123/568.14 |
| 2015/0184603 A1 * | 7/2015 | Han | ..................... | F02B 37/183 60/600 |

FOREIGN PATENT DOCUMENTS

| | | | |
|---|---|---|---|
| DE | 102017116648 A1 | | 1/2019 |
| EP | 0754844 A1 | | 1/1997 |
| JP | 2007127042 A | * | 5/2007 |
| WO | 2008048909 A2 | | 4/2008 |
| WO | WO-2014198449 A1 | * | 12/2014 ......... F02D 41/0007 |

* cited by examiner

METHODS AND SYSTEMS FOR A VEHICLE

CROSS REFERENCE TO RELATED APPLICATIONS

The present application claims priority to German Patent Application No. 102019213132.8 filed on Aug. 30, 2019. The entire contents of the above-listed application is hereby incorporated by reference for all purposes.

FIELD

The present description relates generally to operating a hydrogen combustion engine with exhaust gas recirculation.

BACKGROUND SUMMARY

Fully electrically operated vehicles, such as battery-electric vehicles (BEV), and vehicles with fuel cells represent two examples of carbon dioxide-free vehicles, wherein freedom from carbon dioxide relates to the supply path proceeding from the vehicle tank or the vehicle battery.

A further option for carbon dioxide-free vehicles are vehicles with a hydrogen combustion engine, in which a hydrogen-containing fuel is burned. Hydrogen is distinguished by enhanced oxidizability or combustibility under lean conditions, such that the internal combustion engine can be operated without throttling. The combustion air ratio $\lambda$ corresponds to the engine load, that is to say an alteration of the engine load can be met with an alteration of the quality of the fuel-air mixture.

The exhaust gas generated during the combustion of pure hydrogen contains water and nitrogen oxides as sole components. In addition, hydrogen and oxygen are also found in the exhaust gas if the combustion occurs incompletely.

Nitrogen oxides constitute air pollutants, and the emission thereof into the surroundings is regulated by governments. If $\lambda \leq 1$, that is to say if a rich or stoichiometric fuel-air mixture is burned, such that consequently also a rich or stoichiometric exhaust gas is obtained, an aftertreatment of the exhaust gas for the purposes of removing nitrogen oxides via a catalytic converter is possible, which results in relatively low costs. However, under these conditions, the fuel is only incompletely burned and is partially released unutilized into the surroundings. Additionally, in part-load operation, throttling losses arise, such that the energy balance is poor.

If the combustion of the fuel-air mixture takes place with an excess of air at a sufficiently high combustion air ratio, for example $\lambda \geq 2$, only so few nitrogen oxides are generated during the combustion, owing to the low combustion temperature, that exhaust-gas aftertreatment for the purposes of reducing the nitrogen oxide emissions is not necessary. However, at $\lambda=2$, the power density of the internal combustion engine is only half as great as that at $\lambda=1$, because only half the quantity of fuel is fed to the internal combustion engine for the same air quantity.

By contrast, in an interposed range of for example $1<\lambda<2$, the fraction of nitrogen oxides formed may be relatively high, and these may not be reduced into compounds that contribute less to greenhouse emissions.

On example approach for a hydrogen engine is shown in U.S. Pat. No. 7,281,531 B1 describes a method for operating a hydrogen combustion engine, in which exhaust gas is recirculated into the combustion chamber in order to set stoichiometric conditions, that is to say a combustion air ratio $\lambda=1$, at all times. Aside from a stabilization of the combustion conditions, it is possible in this way to achieve a reduction of the nitrogen oxide emissions in that, for the exhaust-gas aftertreatment, a conventional 3-way catalytic converter can be used for the reduction of the nitrogen oxides and, furthermore, less oxygen is available for the formation of nitrogen oxides during the combustion process. Furthermore, a reduced combustion temperature and a reduced flame speed contribute to the reduction of the formation of nitrogen oxide. Owing to the stoichiometric operation of the internal combustion engine, exhaust-gas aftertreatment is however necessary at all times owing to the elevated nitrogen oxide formation at $\lambda=1$.

Further to the method known from U.S. Pat. No. 7,281,531 B1, WO 2008/048 909 A2 describes a method in which, likewise, hydrogen is burned under stoichiometric conditions at all times, which conditions are set through variation of the fed quantities of fresh air, recirculated exhaust gas and hydrogen. Furthermore, the corresponding throughflow rates are set such that the desired torque is provided. Consequently, in this method, too, catalytic exhaust-gas aftertreatment is necessary in all cases owing to the elevated nitrogen oxide formation at $\lambda=1$.

The present disclosure is based on a hydrogen combustion engine that can be operated in an effective manner with low nitrogen oxide emissions into the surroundings.

The problems described above may be at least partially solved by a method for operating a hydrogen combustion engine configured to burn a hydrogen-containing fuel in a combustion chamber of the hydrogen combustion engine. The method may further comprise operating the hydrogen combustion engine with a first combustion air ratio with a $\lambda_A \leq 1$ during conditions of higher torque demand. The method further comprises operating the hydrogen combustion engine with a second combustion air ratio with a $\lambda_B \geq 2$ during conditions of lower torque demand. Switching from the second combustion air ratio to the first combustion air ratio in response to a torque demand increasing, wherein switching comprises advancing an intake valve opening to increase EGR flow to the combustion chamber as a fuel injection amount is increased. In this way, higher $NO_X$ output conditions may be avoided and $NO_X$ output reduced overall.

In another example, a method for a hydrogen combusting engine comprises measures with which operation of the hydrogen combustion engine at a combustion air ratio range with elevated nitrogen oxide emissions, for example in the range $1<\lambda<1.3$, can be avoided. In order to nevertheless be able to utilize the engine power that is attainable in this range and operate the internal combustion engine in an effective manner, a change between $\lambda \leq 1$ and $\lambda \geq 1.3$ is proposed. Here, the combustion air ratio is set by alteration of the fraction of internally recirculated exhaust gas (EGR fraction).

A torque shock can be prevented, that is to say the change between $\lambda \leq 1$ and $\lambda \geq 1.3$ can take place as far as possible without any jerk, by virtue of the quantity of the fuel-air-EGR mixture that is burned in the combustion chamber being correspondingly varied.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
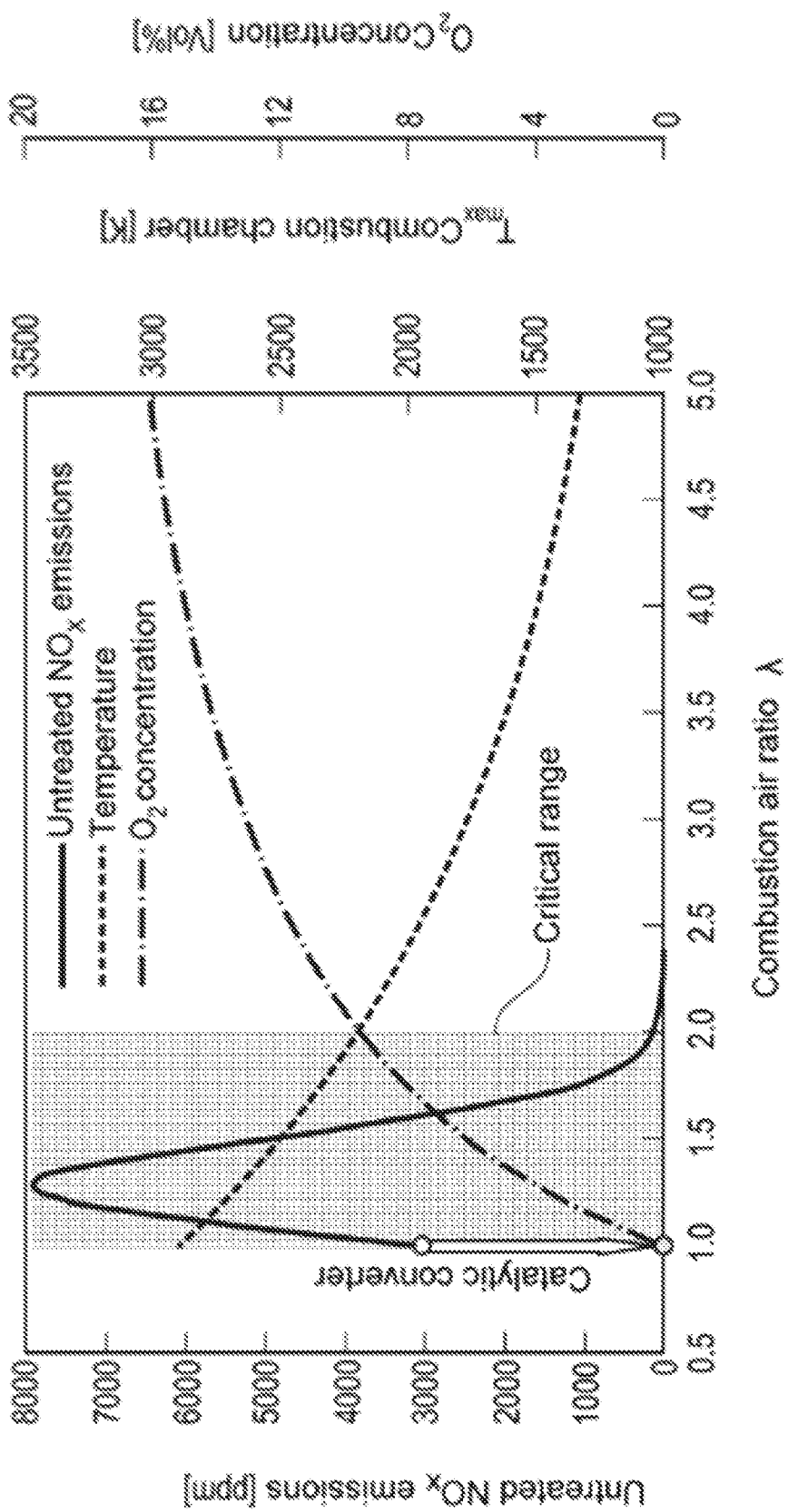
FIG. 1 shows an overview diagram of the dependency of the untreated nitrogen oxide emissions on the combustion air ratio of a hydrogen combustion engine.

The following description relates to systems and methods for a hydrogen combusting engine. In the method according to the disclosure for operating a hydrogen combustion engine with internal exhaust-gas recirculation, hydrogen-containing fuel is burned in a combustion chamber of the hydrogen combustion engine with a first combustion air ratio $\lambda A$ in a first combustion air ratio range of $\lambda \leq 1$ in a first operating state and with a second combustion air ratio $\lambda B$ in a second combustion air ratio range of $\lambda \geq 1.3$ in a second operating state. The combustion chamber is formed by the volume enclosed by cylinder, piston, and cylinder head.

Optionally, the lower limit of the second combustion air ratio range may be selected to be higher, that is to say the second combustion air ratio range may be $\lambda \geq 1.5$, $\lambda \geq 1.8$, or $\lambda \geq 2$. It is thus possible to react to engine-specific and fuel-specific peculiarities in that the "prohibited combustion air ratio range" situated between the first combustion air ratio range and the second combustion air ratio range can be adapted to the specific conditions. An abrupt transition occurs between the first combustion air ratio $\lambda A$ in the first combustion air ratio range of $\lambda \leq 1$ and the second combustion air ratio $\lambda B$ in the second combustion air ratio range of $\lambda \geq 1.3$, $\lambda \geq 1.5$, $\lambda \geq 1.8$, and/or $\lambda \geq 2$.

In other words, in one example, the hydrogen combustion engine is not operated in an operating state with a combustion air ratio $\lambda X$ in the case of which the combustion air ratio $\lambda X$ lies neither in the first combustion air ratio range nor in the second combustion air ratio range. The high nitrogen oxide emissions associated with such a combustion air ratio can advantageously be avoided. For example, if $\lambda A \leq 1$ and $\lambda B \geq 1.5$, then air fuel ratio values between 1 and 1.5 may not be used for the hydrogen combustion engine.

A hydrogen combustion engine is to be understood to mean an internal combustion machine for converting chemical energy contained in the fuel into mechanical work. During the combustion process, exhaust gas is formed which is introduced into an exhaust tract adjoining the internal combustion engine. The fresh air used for the combustion process is fed to the internal combustion engine from the outside via an air intake tract. The internal combustion engine is configured for internal exhaust-gas recirculation, such that a fraction of the generated exhaust gas is left behind in the combustion chamber after the combustion, and a fuel-fresh air-EGR mixture is formed in the combustion chamber. Depending on the combustion air ratio during the combustion process, the EGR contains not only the combustion products, such as for example $CO_2$, $H_2O$, $NO_X$ etc., but also a certain fraction of unconsumed air.

The hydrogen combustion engine may be the internal combustion engine of a vehicle, for example of a passenger motor vehicle or heavy goods motor vehicle. The hydrogen combustion engine may be in the form of a 4-stroke engine.

The combustion air ratio $\lambda$ describes the ratio of the air mass that is actually available for the combustion of fuel to the minimum desired stoichiometric air mass that is theoretically required for a complete combustion. $\lambda=1$ means that a stoichiometric combustion air ratio is present. $\lambda<1$ means that there is a deficiency of air, and a rich fuel-air mixture is present. $\lambda>1$ means that there is an excess of air, and a lean fuel-air mixture is present. The expression "air" as per the above definition includes air contained in the EGR.

The fuel that is used comprises hydrogen or is composed of hydrogen, that is to say, as fuel, use may be made of pure hydrogen or of a hydrogen mixture, for example a mixture of hydrogen and methane. Preferably, a fuel may be used which, in the case of a combustion air ratio of $\lambda \geq 2$, can be burned with a sufficient reaction rate, that is to say with a reaction rate which is sufficient for the operation of the internal combustion engine, and which permits engine operation with a combustion air ratio of $\lambda \geq 2$.

According to the disclosure, a change between the first operating state and the second operating state occurs, between two successive working cycles of the hydrogen combustion engine, that is to say, in the case of a 4-stroke internal combustion engine, after the completion of in each case four successive strokes, that is to say one complete cycle run-through (engine cycle). In other words, a switchover can be performed between the first operating state and the second operating state, that is to say the first combustion air ratio $\lambda A$ and the second combustion air ratio $\lambda B$, in a cycle-synchronous manner.

The change between the first operating state and the second operating state occurs in that the EGR fraction of the fuel-fresh air-EGR mixture is altered, with a constant fuel quantity in the combustion chamber, such that, in the case of a change from the first operating state to the second operating state, a combustion air ratio in the second combustion air ratio range is set and, in the case of a change from the second operating state to the first operating state, a combustion air ratio in the first combustion air ratio range is set, and a quantity of the fuel-fresh air-EGR mixture in the combustion chamber is reduced in the case of a change from the first operating state to the second operating state and is increased in the case of a change from the second operating state to the first operating state.

In other words, a switchover from the first operating state to the second operating state occurs in that the EGR fraction in the fuel-fresh air-EGR mixture is reduced, with a constant fuel quantity, such that a combustion air ratio of a $\lambda B \geq 1.3$ is attained (quality control). Furthermore, the quantity of the fuel-fresh air-EGR mixture is reduced with a constant combustion air ratio in the combustion chamber, such that less fuel is available for the combustion (quantity control).

The switchover from the first operating state to the second operating state may occur if a torque demand is present which, in the case of quality control alone, would lead to a combustion air ratio $\lambda X$ in the range $1<\lambda X<1.3$. This may be the case for example if the hydrogen combustion engine is operated in the full-load range in the first operating state and the demanded torque is reduced.

A switchover from the second operating state to the first operating state occurs in that the EGR fraction in the fuel-fresh air-EGR mixture is increased, with a constant fuel quantity, such that a combustion air ratio of $\lambda A \leq 1.3$ is attained (quality control). Furthermore, the quantity of the fuel-fresh air-EGR mixture is increased with a constant combustion air ratio in the combustion chamber, such that more fuel is available for the combustion (quantity control).

The switchover from the second operating state to the first operating state may occur if a torque demand is present which, in the case of quality control alone, would lead to a combustion air ratio λX in the range 1<λX<1.3. This may be the case for example if the hydrogen combustion engine is operated in the part-load range in the second operating state and the demanded torque is increased.

Consequently, the quantity of the fuel-fresh air-EGR mixture in the combustion chamber can be varied correspondingly to the respective combustion air ratio such that the desired torque is obtained with reduced NVH (e.g., a jerk-free manner).

The EGR fraction of the fuel-fresh air-EGR mixture can be altered, with a constant fuel quantity, firstly with a constant air quantity, the EGR quantity is altered, secondly with a constant EGR quantity, the air quantity is altered, or thirdly both the air quantity and the EGR quantity are altered. In one example, the first option may be desired because the EGR quantity can be altered easily and quickly by shifting of the timing of the valve opening and/or valve closing time.

The variation of the combustion air ratio λ, between the two operating states permits operation of the hydrogen combustion engine with low nitrogen oxide emissions, because nitrogen oxides formed in the first operating state can be sufficiently aftertreated and converted into less greenhouse-causing substances, for example via a 3-way catalytic converter. By contrast, in the second operating state, fewer nitrogen oxides are formed during the fuel combustion, such that the nitrogen oxide emissions into the surroundings are altogether very low. Additionally, the internal exhaust-gas recirculation causes a reduction in the combustion temperature, which leads to a reduction in the nitrogen oxide formation.

This makes it possible for stringent legal requirements with regard to air pollutant emissions to be complied with.

Furthermore, the variation of the combustion air ratio λ between the two operating states in addition also permits effective operation of the hydrogen combustion engine in that the engine power range is replicated between 1<λ<1.3 through corresponding alteration of the EGR fraction and of the quantity of the fuel-fresh air-EGR mixture.

In some embodiments, the fuel is fed directly to the combustion chamber. In other words, a direct injection with internal mixture formation may occur. This permits an alteration of the EGR fraction independently of the fuel quantity. To reduce or increase the quantity of the fuel-fresh air-EGR mixture in the combustion chamber, the fuel quantity, the fresh-air quantity and the EGR quantity are reduced or increased correspondingly to one another, wherein the combustion air ratio remains constant.

In further embodiments, prior to the alteration of the EGR fraction, a quantity of the fuel is, in the case of a change from the first operating state to the second operating state, reduced until a combustion air ratio λ=1 is attained, and, in the case of a change from the second operating state to the first operating state, increased until a combustion air ratio λ which corresponds to the lower limit of the second combustion air ratio range is attained.

In other words, quality control firstly occurs to the point at which the limit of the "prohibited combustion air ratio range" is reached, before the EGR fraction and the quantity of the fuel-fresh air-EGR mixture in the combustion chamber are altered. In this way, the hydrogen combustion engine can be operated even more effectively, because the influence of the quantity control is kept as low as possible.

In some embodiments, the EGR fraction may be altered by shifting of the timing of a valve opening and/or valve closing time of an inlet and/or outlet valve. For example, the valve opening times may be modified such that they overlap.

An increase of the EGR quantity and consequently of the EGR fraction may be attained for example by virtue of the valve opening time of the inlet valve being moved forward to an earlier point in time, for example a point in time before the top dead center is reached (advancing).

A reduction of the EGR quantity and consequently of the EGR fraction may be attained for example by virtue of the valve opening time of the inlet valve being moved to a later point in time (retarding). The shifting of the timing of the valve opening and/or valve closing time of the inlet and/or outlet valve may be performed for example in accordance with a so-called "boot lift profile" or a "multi-lift profile", wherein, in the case of a "multi-lift profile", the inlet valve performs two mutually independent valve strokes during one working cycle, of which the first valve stroke occurs before the top dead center.

It is thus possible, for example, for the combustion air ratio λ to be reduced from a λB≥2 to λA≤1 by virtue of the valve opening time of the inlet valve being moved forward to an earlier point in time or a second valve stroke being performed before the actual valve stroke of the inlet valve. To increase the combustion air ratio λ from λA≤1 to λB≥2, the valve opening time of the inlet valve may be shifted to a later point in time, or a previously performed second valve stroke before the actual valve stroke of the inlet valve may be omitted.

Furthermore, the quantity of the fuel-fresh air-EGR mixture in the combustion chamber may be reduced or increased via an alteration, corresponding to the fuel quantity and the fresh-air quantity, of the EGR quantity by shifting of the timing of the valve opening and/or valve closing time of the inlet and/or outlet valve.

This permits accurate and fast setting of the EGR fraction and an as far as possible jerk-free switchover between the first operating state and the second operating state.

In some embodiments, the shifting of the timing of the valve opening and/or valve closing time of the inlet and/or outlet valve may occur via a fully variable valve controller, that is to say via a valve controller which permits an alteration of the valve opening duration and of the valve stroke. The fully variable valve controller may be electrohydraulically operated, in one example. A fully variable electrohydraulic valve controller advantageously permits a particularly fast alteration of the shifting of the timing of the valve opening and/or valve closing time, such that an alteration from one working cycle to the next working cycle is possible.

In different design variants, the engine system has a hydrogen combustion engine with multiple, for example four, cylinders, and is designed as a 4-stroke engine. The hydrogen combustion engine is assigned a fully variable electrohydraulic valve controller, via which the valve opening and/or valve closing time of an inlet and/or outlet valve can be shifted in terms of timing from working cycle to working cycle.

A control unit is connected in signal-transmitting fashion to, or is integrated into, the fully variable electrohydraulic valve controller in order to set valve opening and/or valve closing times and output corresponding control signals to the fully variable electrohydraulic valve controller. The control unit is furthermore designed and configured to control a fuel quantity that is fed directly to the combustion chamber.

During the operation of the hydrogen combustion engine, a change between the first operating state and the second operating state occurs, preferably between two successive working cycles. For this purpose, via the control unit, corresponding control signals are output to the fully variable electrohydraulic valve controller in order, by shifting of the timing of the valve opening and/or valve closing time of the inlet and/or outlet valve, to effect a change between the first combustion air ratio λA in the first combustion air ratio range of $\lambda \leq 1$ and the second combustion air ratio λB in the second combustion air ratio range of $\lambda \geq 1.3$.

Furthermore, the fresh-air quantity, EGR quantity and fuel quantity fed to the combustion chamber are correspondingly altered relative to one another with an unchanging combustion air ratio. The generated torque may, despite the change of the combustion air ratio λ, remain substantially constant or correspond to an expected profile, that is to say no change in torque, or the desired change in torque, is perceptible to the driver of a vehicle equipped with the hydrogen combustion engine.

A motor vehicle according to the disclosure has an engine system according to the above description.

The advantages of the motor vehicle according to the disclosure correspond to those of the engine system according to the disclosure. Furthermore, the disclosure has a particularly advantageous effect in a motor vehicle because it permits adherence to stringent legal requirements with regard to the admissible emission of air pollutants.

A further aspect of the disclosure relates to a computer program product which comprises commands which cause the engine system described above to be able to carry out a method according to the above description.

A computer program product is to be understood to mean program code which is stored on a suitable medium and/or which can be accessed by means of a suitable medium. For the storage of the program code, use may be made of any medium which is suitable for storing software, for example a nonvolatile memory installed in a control unit, a DVD, a USB stick, a flash card or the like. The program code may be accessed for example via the Internet or an intranet or via some other suitable wireless or wired network.

Turning now to FIG. 1, it graphically illustrates the dependencies of the untreated nitrogen oxide emissions, the maximum temperature, and the oxygen concentration in the combustion chamber on the combustion air ratio λ. It can be seen that the untreated nitrogen oxide emissions in the case of a combustion air ratio of $\lambda < 2$ increases as far as a maximum at approximately $\lambda \sim 1.3$ and subsequently falls again with decreasing combustion air ratio λ. Below $\lambda = 1$, a catalytic converter may be utilized, such that the initially emitted nitrogen oxides can be aftertreated and do not pass into the surroundings.

However, between $1 < \lambda < 2$, there is a critical range in which a catalytic treatment of the nitrogen oxides is not efficient with reasonable outlay. Therefore, this range may be avoided during the operation of a hydrogen combustion engine.

It can also be seen in FIG. 1 that the oxygen concentration increases with increasing combustion air ratio λ, whereas the maximum temperature in the combustion chamber falls. The stated effects are at least partially mutually dependent. For example, the formation of nitrogen oxides during the fuel combustion is temperature-dependent.

Figure 2:
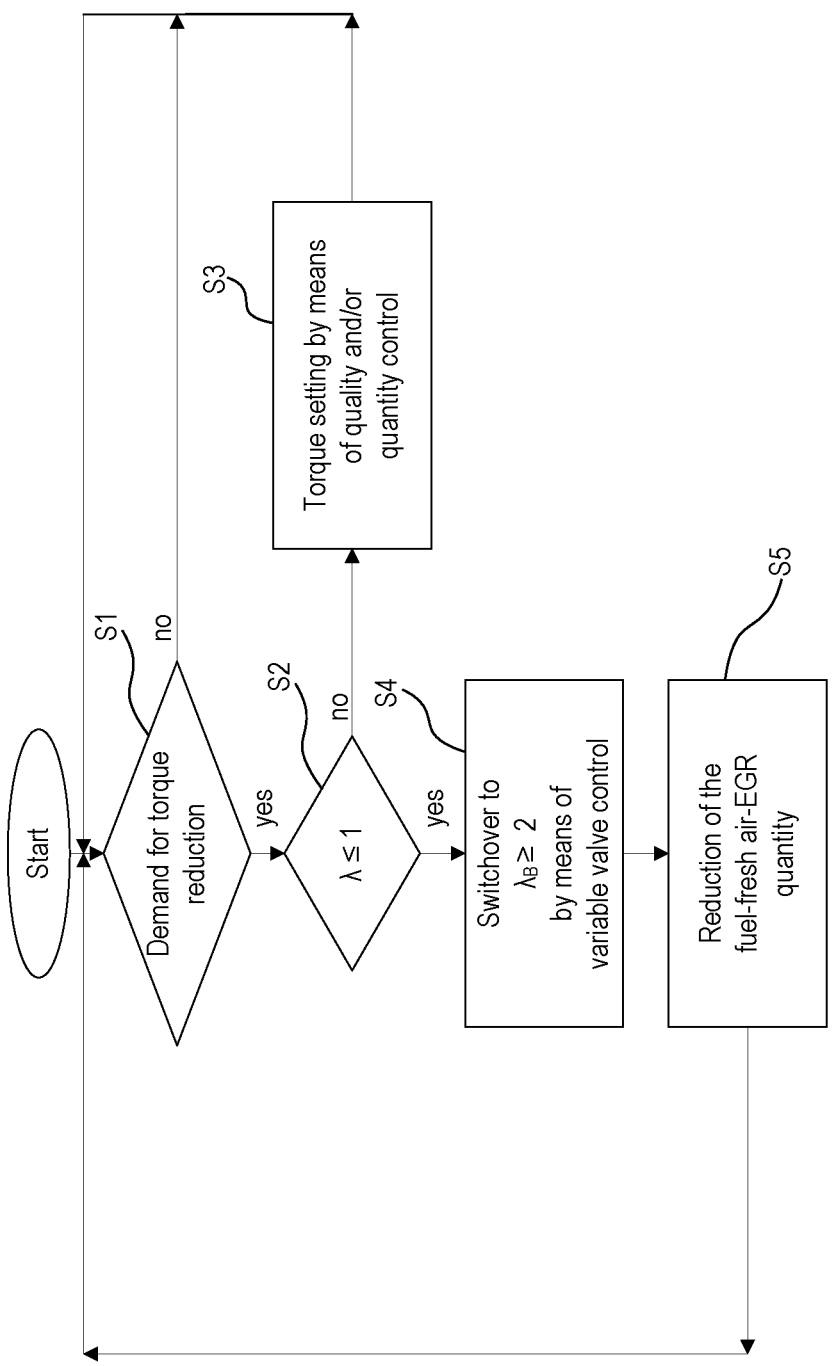
FIGS. 2 and 3 show flow diagrams of an exemplary method.
Figure 3:
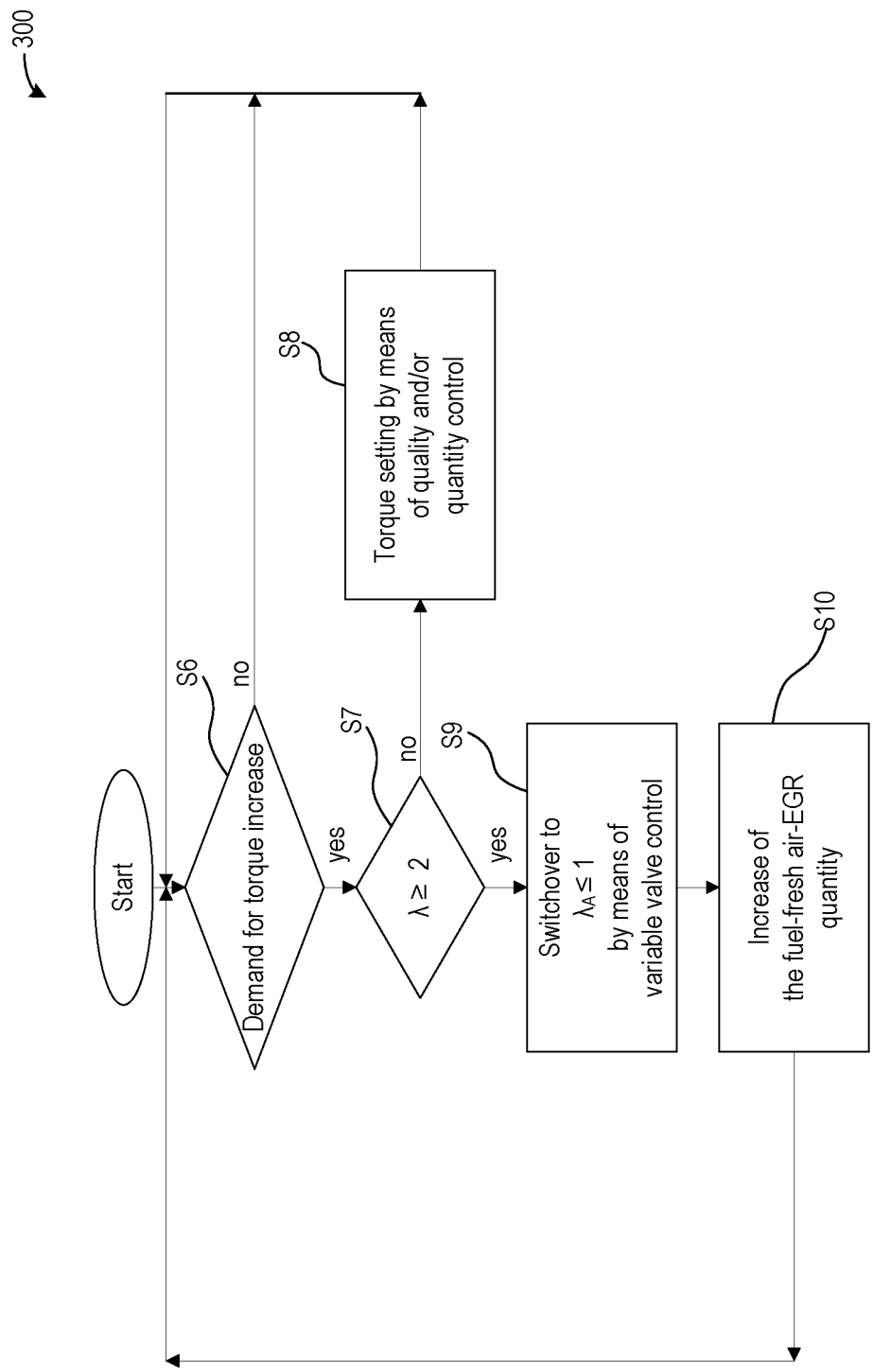

FIGS. 2 and 3 show flow diagrams of an exemplary method for operating a hydrogen combustion engine with internal exhaust-gas recirculation. This may for example be a 4-stroke four-cylinder engine operated with pure hydrogen. The hydrogen combustion engine is assigned a fully variable electrohydraulic valve controller, via which the valve opening and/or valve closing time of an inlet and/or outlet valve can be shifted in terms of timing. In this exemplary embodiment, the second operating state has a second combustion air ratio λB in a second combustion air ratio range of $\lambda \geq 2$. As already described, the lower limit of the second combustion air ratio range may be set differently, for example to 1.3, 1.5 or 1.8.

Instructions for carrying out methods may be executed by a controller based on instructions stored on a memory of the controller and in conjunction with signals received from sensors of the engine system, such as the sensors described above with reference to FIG. 7. The controller may employ engine actuators of the engine system to adjust engine operation, according to the methods described below.

FIG. 2 illustrates a method 200 in which a torque reduction is demanded and a change from the first to the second operating state occurs.

After the start of the method, it is checked in step S1 whether a demand for a torque reduction is present. If this is not the case, the presence of a demand for a torque reduction is checked again, for example continuously or at predefinable time intervals. In one example, a torque amount is set based on an accelerator pedal position and an engine speed. In one example, a torque reduction may be requested in response to a vehicle operator releasing the accelerator pedal to a more inclined position.

If a demand for a torque reduction is present (e.g., accelerator pedal is released from a more depressed position to a more inclined positioned), the method 200 continues to step S2. In step S2, it is checked whether the combustion air ratio is $\lambda \leq 1$, that is to say whether the hydrogen combustion engine is being operated in the first operating state.

If the engine is not being operated in the first operating state, then the hydrogen combustion engine operated is already in the second operating state, because, in the implementation of the method according to the disclosure, operation of the hydrogen combustion engine in a combustion air ratio range between the first combustion air ratio range and the second combustion air ratio range is avoided. Since the hydrogen combustion engine is thus already in the second operating state, the torque can, in step S3, be reduced in the conventional manner through reduction of the fuel quantity (quality control) or reduction of the quantity of the fuel-fresh air-EGR mixture (quantity control). The method subsequently returns to step S1.

By contrast, if it is identified in step S2 that the combustion air ratio is $\lambda \leq 1$, that is to say the hydrogen combustion engine is being operated in the first operating state, the method continues to step S4.

In step S4, a switchover to a second combustion air ratio λB in a second combustion air ratio range of $\lambda \geq 2$ via the variable valve control is performed in that the EGR fraction of the fuel-fresh air-EGR mixture is reduced with a constant fuel quantity.

In step S5, the quantity of the fuel-fresh air-EGR mixture is reduced with a constant combustion air ratio λB in the combustion chamber by virtue of the air quantity fed to the combustion chamber, the EGR quantity and the fuel quantity fed to the combustion chamber being reduced correspondingly to one another. Here, the fuel quantity is selected so as to result in the demanded torque. The fresh-air quantity may be reduced for example by reduction of the valve stroke and/or shortening of the valve opening duration of the inlet valve. The steps S4 and S5 may also be performed simultaneously or in a reversed sequence. The method returns to step S1 to continue monitoring torque request fluctuations.

FIG. 3 illustrates where a torque increase is demanded and a change from the second to the first operating state occurs. This case will be discussed below.

After the start of the method 300, it is checked in step S6 whether a demand for a torque increase is present. If this is not the case, the presence of a demand for a torque increase is checked again, for example continuously or at predefinable time intervals. The demand for the torque increase may include where accelerator pedal is moved to a more depressed position from an inclined position. In one example, the accelerator is further depressed.

If a demand for a torque increase is present, the method continues to step S7. In step S7, it is checked whether the combustion air ratio is $\lambda \geq 2$, that is to say whether the hydrogen combustion engine is being operated in the second operating state.

If the engine is not being operating in the second operating state, then the hydrogen combustion engine is being operated in the first operating state, because, in the implementation of the method according to the disclosure, operation of the hydrogen combustion engine in a combustion air ratio range between the first combustion air ratio range and the second combustion air ratio range is avoided. Since the hydrogen combustion engine is thus already in the first operating state, the torque can, in step S8, be increased in the conventional manner through increasing of the fuel quantity (quality control) or increasing of the quantity of the fuel-fresh air-EGR mixture (quantity control). The method subsequently returns to step S6.

By contrast, if it is identified in step S7 that the combustion air ratio is $\lambda \geq 2$, that is to say the hydrogen combustion engine is being operated in the second operating state, and that a torque increase to the target value is not possible at a combustion air ratio of $\lambda \geq 2$, the method continues to step S9.

In step S9, a switchover to a first combustion air ratio $\lambda A$ in a first combustion air ratio range of $\lambda \leq 1$ via the variable valve control is performed in that the EGR fraction of the fuel-fresh air-EGR mixture is increased with a constant fuel quantity.

In step S10, the quantity of the fuel-fresh air-EGR mixture is increased with a constant combustion air ratio $\lambda A$ in the combustion chamber by virtue of the air quantity fed to the combustion chamber, the EGR quantity and the fuel quantity fed to the combustion chamber being increased correspondingly to one another. Here, the fuel quantity is selected so as to result in the demanded torque. The fresh-air quantity may be increased for example by increasing of the valve stroke and/or lengthening of the valve opening duration of the inlet valve. The steps S9 and S10 may also be performed simultaneously or in a reversed sequence. The method subsequently returns to step S6.

Figure 4:
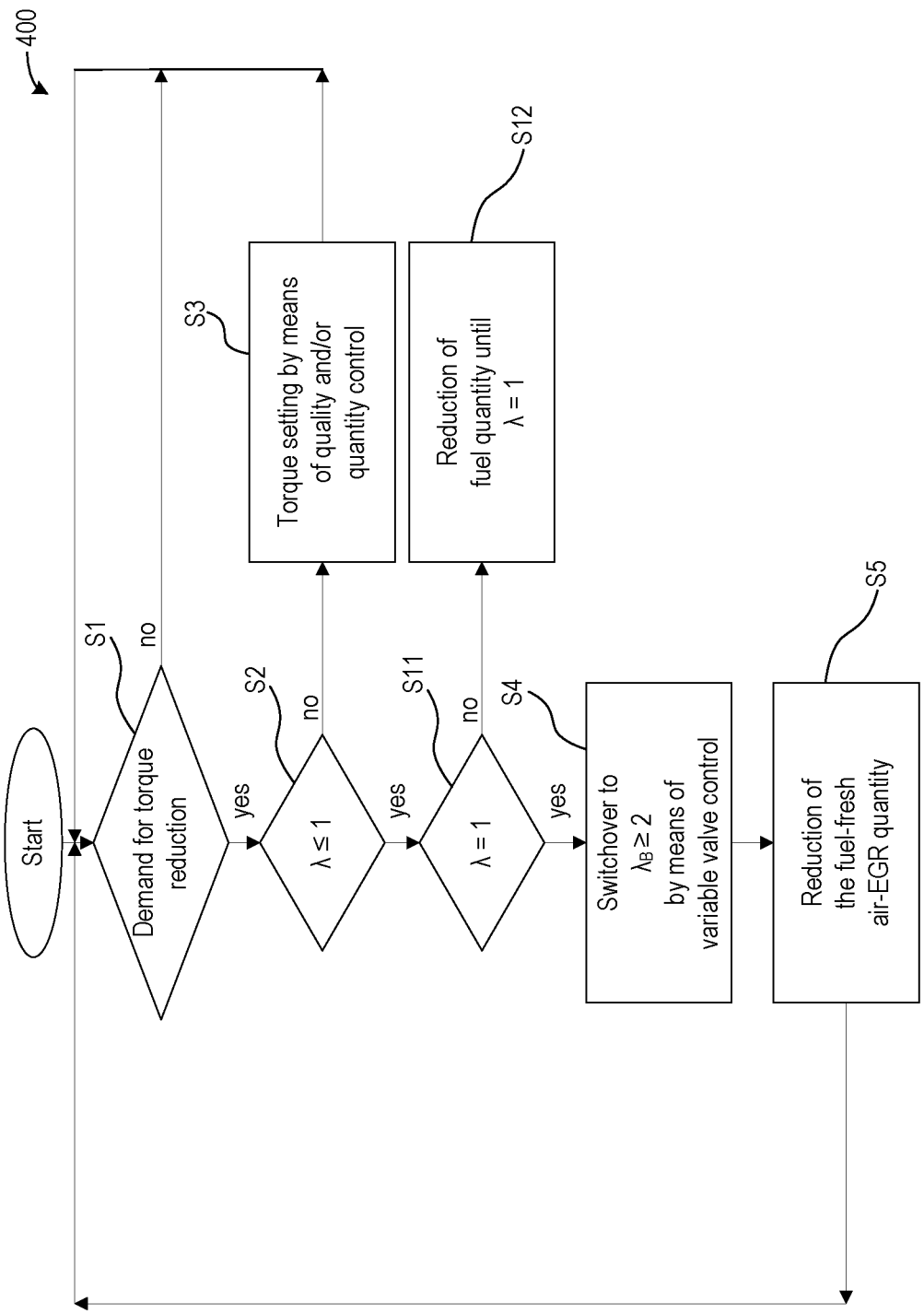
FIGS. 4 and 5 show flow diagrams of a further exemplary method.
Figure 5:
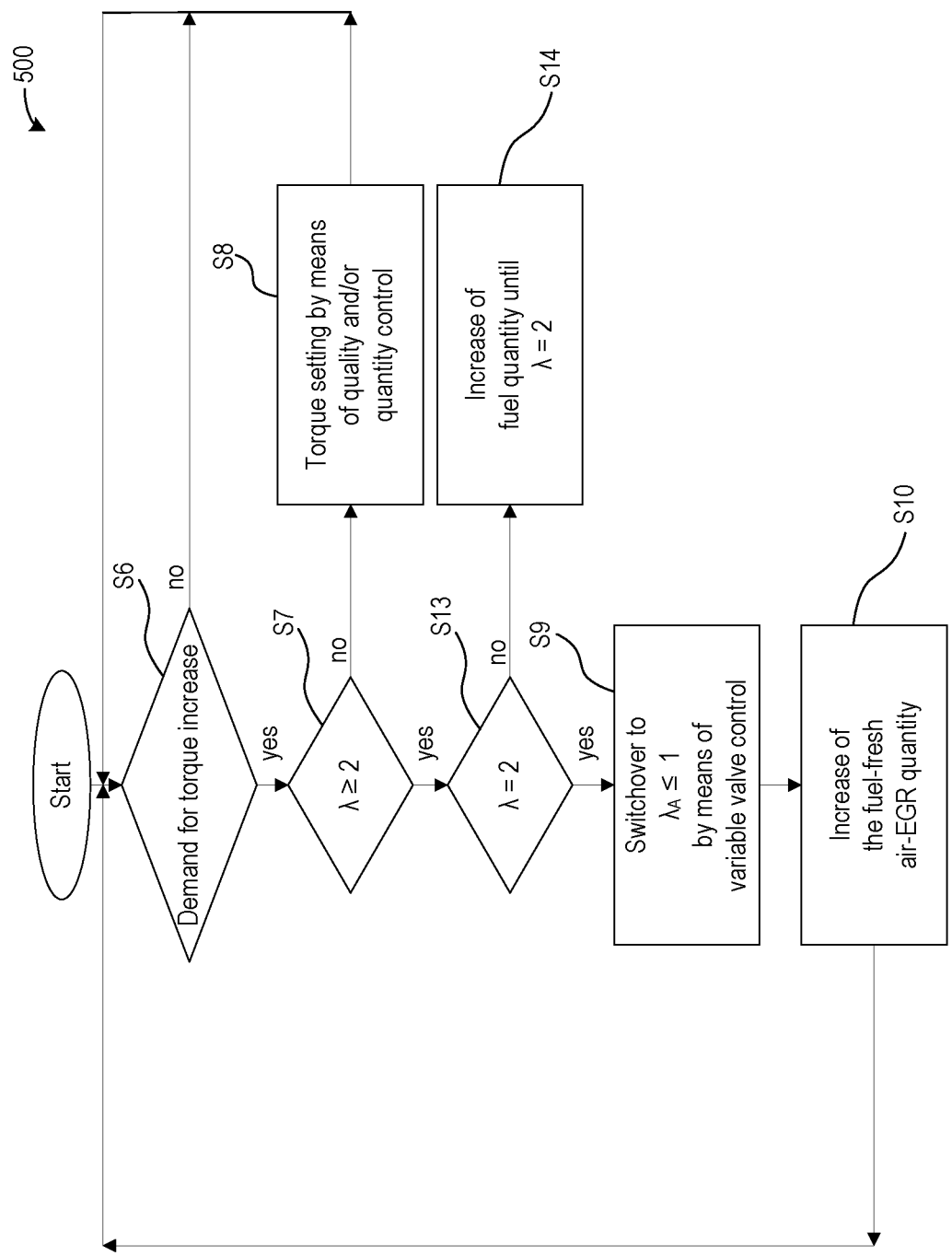

FIGS. 4 and 5 show flow diagrams of further exemplary methods 400 and 500 respectively.

The sub-method 400 shown in FIG. 4 has been modified in relation to the sub-method 200 shown in FIG. 2. If it is identified in step S2 that $\lambda \leq 1$, it is checked in a step S11 whether $\lambda = 1$. If this is the case, then the method continues with step S4, as described with regard to FIG. 2.

By contrast, if it is identified in step S11 that $\lambda = 1$ is not the case, and consequently $\lambda < 1$ applies, an additional step S12 is added. In step S12, the fuel quantity is reduced until $\lambda = 1$ applies. The method subsequently continues with step S4, as described with regard to FIG. 2.

Analogously, the sub-method described with reference to FIG. 3 may also be modified correspondingly, as shown in method 500 of FIG. 5. If it is identified in step S7 that $\lambda \geq 2$, it is checked in a step S13 whether $\lambda = 2$. If this is the case, then the method continues with step S9, as described with regard to FIG. 3.

By contrast, if it is identified in step S13 that $\lambda = 2$ is not the case, and consequently $\lambda > 2$ applies, an additional step S14 is added. In step S14, the fuel quantity is increased until $\lambda = 2$ applies. The method subsequently continues with step S9, as described with regard to FIG. 3.

The described sub-methods 400 and 500 may also be combined with one another.

Figure 6A:
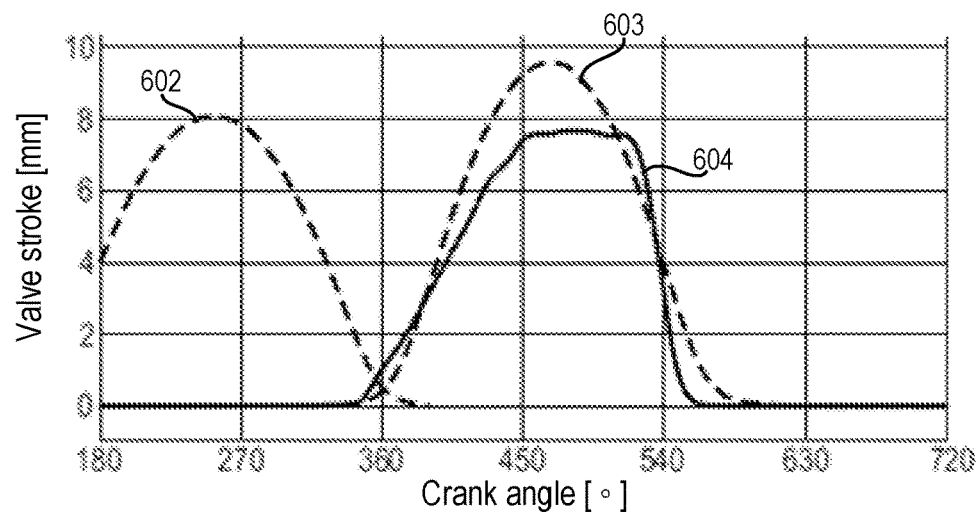
FIG. 6a shows an exemplary standard valve stroke profile.
Figure 6B:
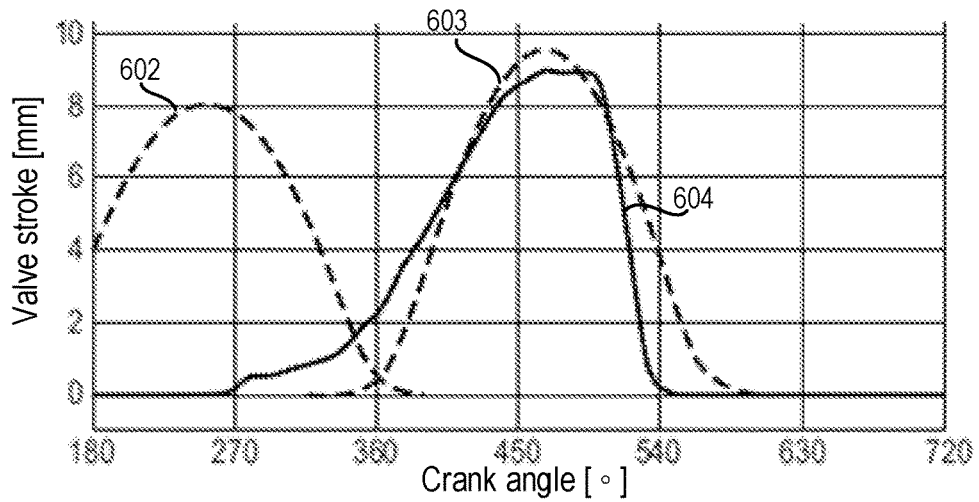
FIG. 6b shows an exemplary valve lift profile in the "boot lift profile"
Figure 6C:
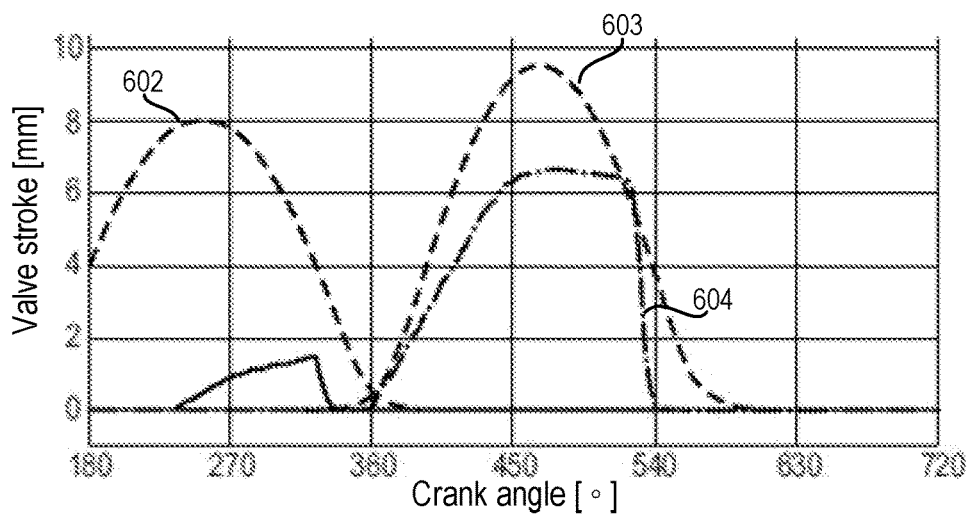
FIG. 6c shows an exemplary valve lift profile in the "multi-lift profile".

FIGS. 6a to 6c show exemplary valve stroke profiles, wherein the profile illustrated by dashed lines constitutes in each case an ideal profile of the outlet valve stroke 602 (on the left, maximum at approximately 250°) and of the inlet valve stroke 604 (on the right, maximum at approximately 470°) in the standard mode. The illustrated valve stroke profiles can be realized by means of a fully variable valve controller.

FIG. 6a shows an actual standard profile 603 of a valve stroke of an inlet valve in relation to the ideal profile 604. The valve opening time is at approximately 345°, and the valve closing time is at approximately 565°.

FIG. 6b shows an actual profile 603 of a valve stroke of an inlet valve in relation to the ideal profile 604 in a "boot lift profile". The valve opening time is at approximately 270°, and the valve closing time is at approximately 540°, that is to say a shift to an earlier time has occurred (advancing), resulting in an overlap of the valve opening times of inlet and outlet valve. A certain fraction of EGR consequently remains in the combustion chamber, and the EGR quantity has been increased in relation to FIG. 6a. In this way, a combustion temperature of the hydrogen combusting engine is reduced as the operating state shifts from a lean operating state to a rich operating state to reduce an amount of $NO_X$ generated during the shift.

FIG. 6c shows an actual profile 603 of a valve stroke of an inlet valve in relation to the ideal profile 604 in a "multi-lift profile", that is to say two valve strokes occur independently of one another. A first, short valve stroke occurs between approximately 235° and 330°. Subsequently, the inlet valve is completely closed again for a short time, before being opened again at approximately 360° and being closed again at approximately 540°. Here, too, there is a resulting overlap of the valve opening times of inlet and outlet valve. Here, too, a certain fraction of EGR remains in the combustion chamber, and the EGR quantity has been increased in relation to FIG. 6a.

Figure 7:
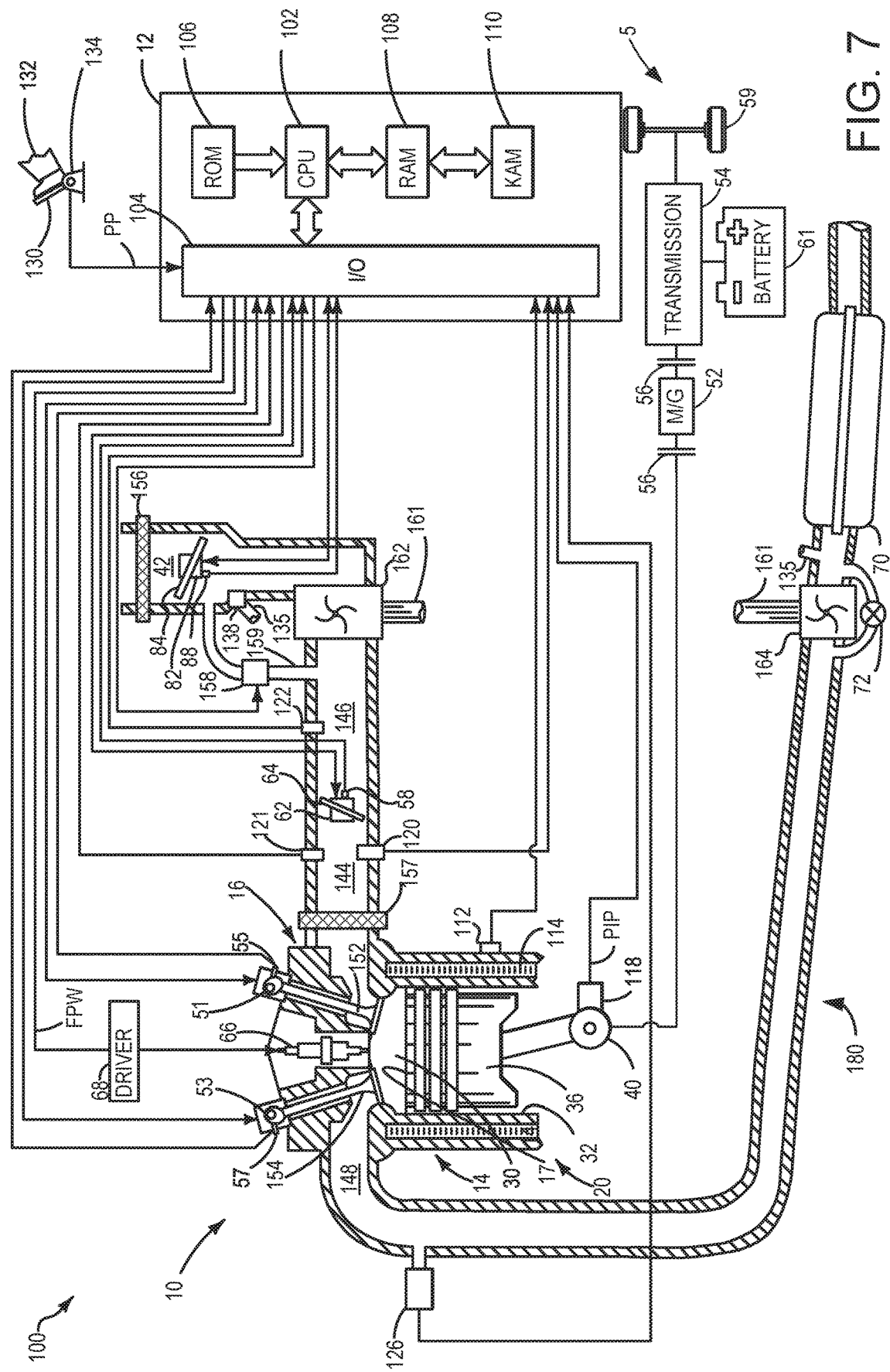
FIG. 7 shows a schematic of an engine of a vehicle.

FIG. 7 depicts an engine system 100 for a vehicle. The vehicle may be an on-road vehicle having drive wheels which contact a road surface. Engine system 100 includes engine 10 which comprises a plurality of cylinders. FIG. 7 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Additionally or alternatively, as described above, the intake valves 152 and the exhaust valves 154 may be operated via a electrohydraulically fully variable controller. In one example, the intake valves 152 or the exhaust valves 154 may be operated via the opening profiles illustrated in FIGS. 6b and 6c.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug for initiating combustion. Ignition system 190 can provide an ignition spark to cylinder 14 via spark plug in response to spark advance signal SA from controller 12, under select operating modes. However, in some embodiments, spark plug may be omitted, such as where engine 10 may initiate combustion by auto-ignition or by injection of fuel as may be the case with some diesel engines.

Fuel injector 66 may be configured to inject directly into the combustion chamber 30. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a hydrogen engine, and the fuel tank may include hydrogen containing fuel, which may be injected by injector 66 directly into the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 7). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 7, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_X$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 7 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 7 and employs the various actuators of FIG. 7 to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

In this way, the hydrogen combustion engine may be ramped from a first operating state comprising a first air/fuel ratio and a second operating state comprising a second air/fuel ratio while avoiding a jerk. In one example, switching the vehicle from the second operating state to the first operating state includes increasing an internal EGR flow rate by utilizing a valve boot lift or a multi-lift profile. The technical effect of adjusting the valve operation is to increase EGR flow as the engine switches from a lean operation to a rich operation is to change a $NO_X$ formation point to lower lambda values closer to the rich operation such that the switch decreases or avoids $NO_X$ formation. At the switch point from second to first operating state, the EGR is increased to dilute the charge so that the engine delivers the same torque as the lean lambda operation point. By doing this, the valvetrain may cycle from the first operating state to the second operating state or vice versa in a jerk-free manner.

FIG. 7 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a hydrogen combustion engine configured to burn a hydrogen-containing fuel in a combustion chamber of the hydrogen combustion engine, the method comprising:
   operating the hydrogen combustion engine with a first combustion air ratio with a $\lambda_A \le 1$ during conditions of higher torque demand;
   operating the hydrogen combustion engine with a second combustion air ratio with $\lambda_B \ge 2$ during conditions of lower torque demand;
   receiving a torque demand increase;
   switching from the second combustion air ratio to the first combustion air ratio in response to the torque demand increasing, wherein switching from the second combustion air ratio to the first combustion air ratio comprises advancing an intake valve opening to increase EGR flow to the combustion chamber as a fuel injection amount is increased;
   receiving a decrease in the torque demand while operating with the first combustion air ratio at a $\lambda < 1$; and
   in response to the torque demand decreasing while operating with the first combustion air ratio at the $\lambda < 1$, decreasing the fuel injection amount to a first combustion air ratio limit of $\lambda = 1$ before adjusting an EGR flow rate and before adjusting an intake air flow rate.

2. The method of claim 1, wherein the torque demand is based on an accelerator pedal position, and wherein the torque demand increasing comprises the accelerator pedal position being depressed.

3. The method of claim 1, wherein advancing the intake valve opening comprises overlapping the intake valve opening with an exhaust valve opening.

4. The method of claim 1, wherein advancing the intake valve opening includes adjusting the intake valve opening to a boot lift profile, wherein the boot lift profile comprises opening the intake valve at a crank angle of 270°.

5. The method of claim 1, wherein advancing the intake valve opening includes adjusting the intake valve opening to a multi-lift profile, wherein the multi-lift profile comprises opening the intake valve at a first crank angle range and at a second crank angle range.

6. The method of claim 5, wherein the first crank angle range is from 235° to 330° and the second crank angle range is from 360° to 540°.

7. A system, comprising:
   a hydrogen combustion engine with an internal exhaust-gas recirculation, wherein a hydrogen-containing fuel is burned in a combustion chamber of the hydrogen combustion engine; and a controller with computer-readable instructions stored on non-transitory memory thereof that when executed enable the controller to:
  operate the hydrogen combustion engine at a first combustion air ratio during a first torque request;
  operate the hydrogen combustion engine at a second combustion air ratio during a second torque request, wherein the second combustion air ratio is greater than the first combustion air ratio; and
  in response to a torque demand decreasing while operating with the first combustion air ratio at a $\lambda<1$, decreasing a fuel injection amount to a first combustion air ratio limit of $\lambda=1$ before adjusting an EGR flow rate and before adjusting an intake air flow rate.

8. The system of claim 7, wherein the instructions further enable the controller to switch from the second combustion air ratio to the first combustion air ratio, wherein switching from the second combustion air ratio to the first combustion air ratio comprises advancing an inlet valve opening.

9. The system of claim 7, wherein the instructions further enable the controller to adjust an EGR flow rate or an intake air flow rate in response to a torque change from the second torque request to the first torque request, wherein the second torque request requests less torque than the first torque request, and wherein a fuel amount delivered to the combustion chamber is unchanged.

10. The system of claim 7, wherein the second combustion air ratio comprises a $\lambda_B \geq 1.3$.

11. The system of claim 7, wherein the second combustion air ratio comprises a $\lambda_B \geq 1.5$.

12. The system of claim 7, wherein the second combustion air ratio comprises a $\lambda_B \geq 1.8$.

13. The system of claim 7, wherein the second combustion air ratio comprises a $\lambda_B \geq 2.0$.

14. The system of claim 7, wherein the instructions further enable the controller to avoid combustion air ratios between the first combustion air ratio and the second combustion air ratio.

15. A method, comprising:
  operating a hydrogen combustion engine at a first combustion air ratio with a $\lambda_A \leq 1.0$ during a first torque request;
  operating the hydrogen combustion engine at a second combustion air ratio with a $\lambda_B \geq 2.0$ during a second torque request, wherein the second combustion air ratio is greater than the first combustion air ratio;
  receiving a torque request change from a first torque request to a second torque request or vice-versa;
  avoiding a combustion air ratio between the first combustion air ratio and the second combustion air ratio in response to the torque request changing from the first torque request to the second torque request or vice-versa, where the torque request changing from the first torque request to the second torque request is an increase in torque demand;
  changing the torque request from the first torque request to the second torque request while operating the hydrogen combustion engine with the second combustion air ratio at a $\lambda>2$; and
  in response to the torque request changing from the first torque request to the second torque request while operating the hydrogen combustion engine with the second combustion air ratio at the $\lambda>2$, increasing a quantity of fuel to a second combustion air ratio limit of $\lambda=2.0$ before adjusting an EGR flow rate and before adjusting an intake air flow rate.

16. The method of claim 15, wherein avoiding the combustion air ratio between the first combustion air ratio and the second combustion air ratio comprises adjusting a timing of one or more of a valve opening or a valve closing of an intake valve or an exhaust valve via a fully variable valve controller.

* * * * *